United States Patent [19]
Ross et al.

[11] 3,748,830
[45] July 31, 1973

[54] METHOD AND APPARATUS FOR PURIFYING COMBUSTION GASES

[75] Inventors: Sigmund L. Ross, Bronx,
Oscar Shuffman, Scarsdale, both of N.Y.

[73] Assignee: Said Oscar Shuffman by Sigmund L. Ross

[22] Filed: May 19, 1972

[21] Appl. No.: 255,001

Related U.S. Application Data

[63] Continuation-in-part of Ser. No. 131,037, April 5, 1971, abandoned, which is a continuation-in-part of Ser. No. 42,622, June 2, 1970, abandoned.

[52] U.S. Cl............................ 55/89, 55/222, 55/228, 55/259, 55/269, 55/276, 55/DIG. 30, 60/310, 60/317, 60/320, 62/323, 165/163
[51] Int. Cl............................................. B01d 50/00
[58] Field of Search......................... 55/89, 222, 228, 55/259, 269, 276; 60/310, 317, 320; 62/323; 165/163

[56] References Cited
UNITED STATES PATENTS 3,153,579 10/1964 Levey et al. .................... 55/DIG. 30
3,678,657 7/1972 Hale............................... 55/DIG. 30

*Primary Examiner*—Bernard Nozick
*Attorney*—Thomas M. Marshall

[57] ABSTRACT

Waste combustion or exhaust gases from an internal combustion engine for motor vehicle or from other sources are directed into intimate, direct contact with the surface of ice which is supported by a subsurface and which presents an extended area of ice surface for travel of the combustion gases in contact therewith for accomplishing the deposition of particulate and other pollutants on the moist ice surface thereby provided. A moist sludge containing the pollutants is sloughed off of the ice surface and is collected, thereby separating the pollutants from residual combustion gases. As a result of passing residual combustion gases over the surface of the collected sludge unburned carbon contained therein is produced in a form having utility as a source of activated carbon and of carbon black.

26 Claims, 22 Drawing Figures

3,748,830

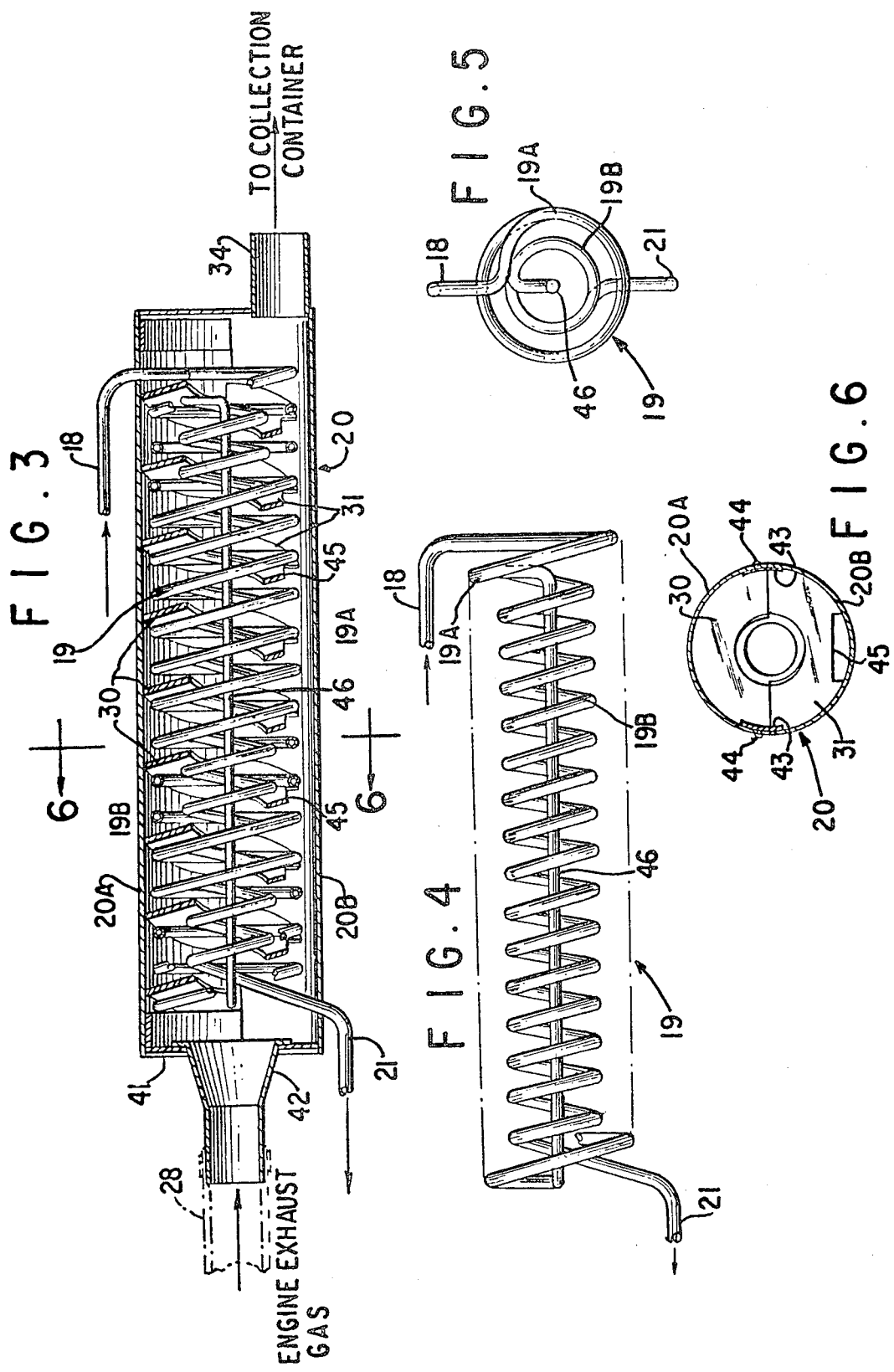

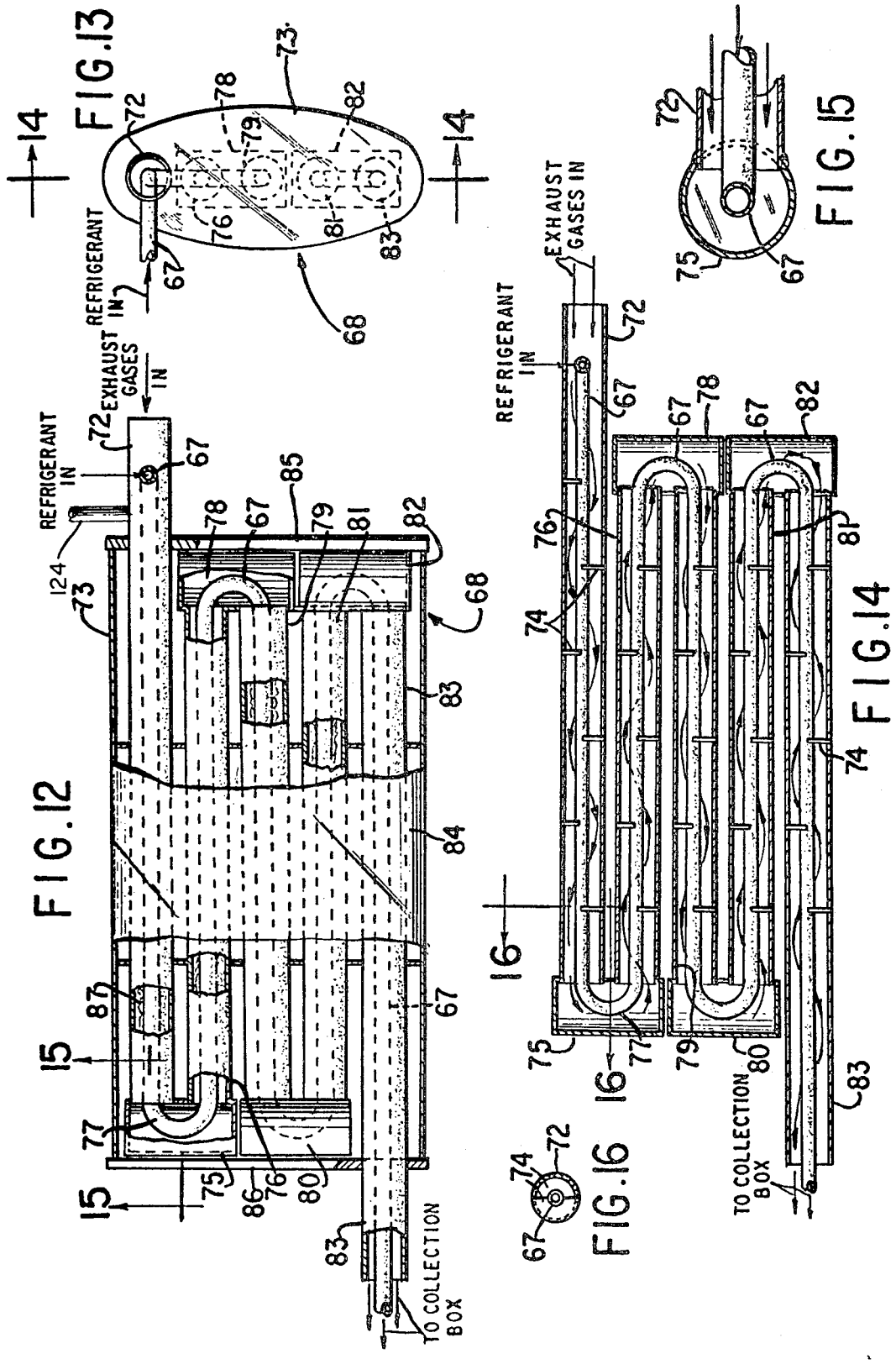

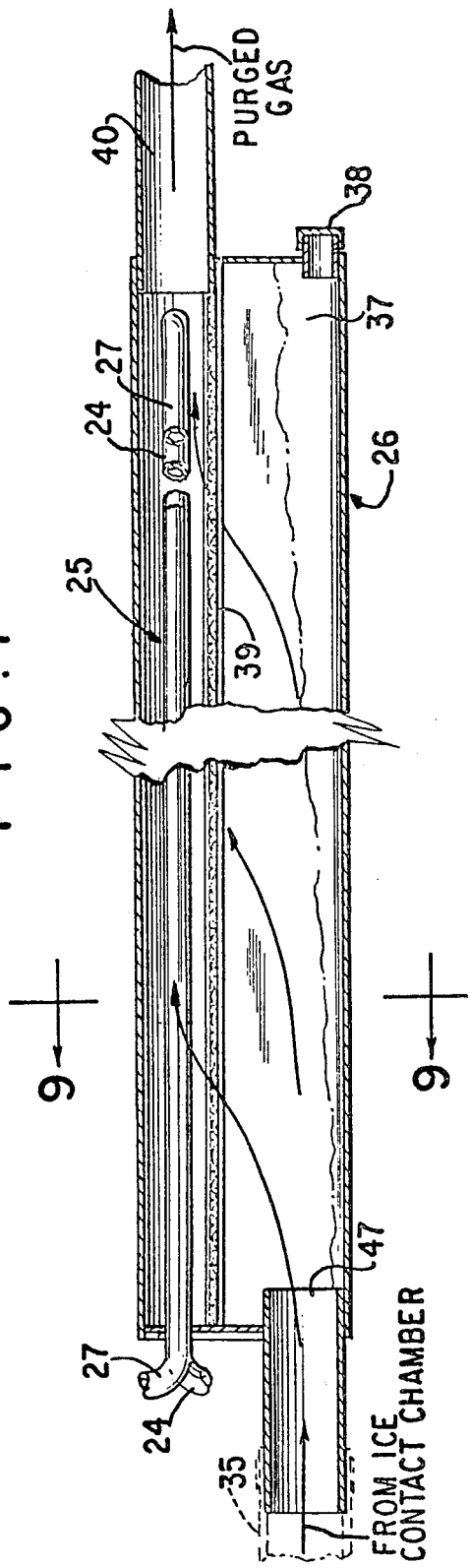
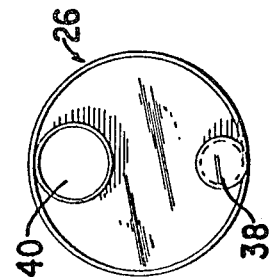
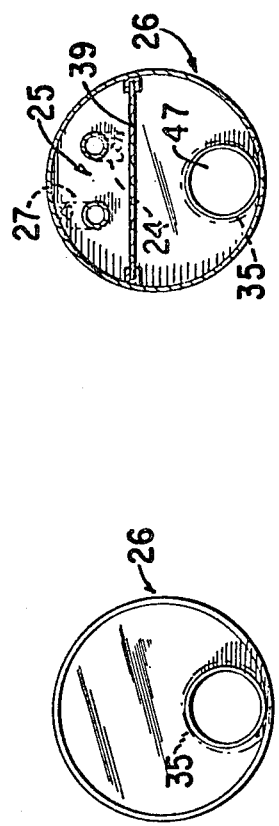
FIG. 7
FIG. 8
FIG. 9
FIG. 10

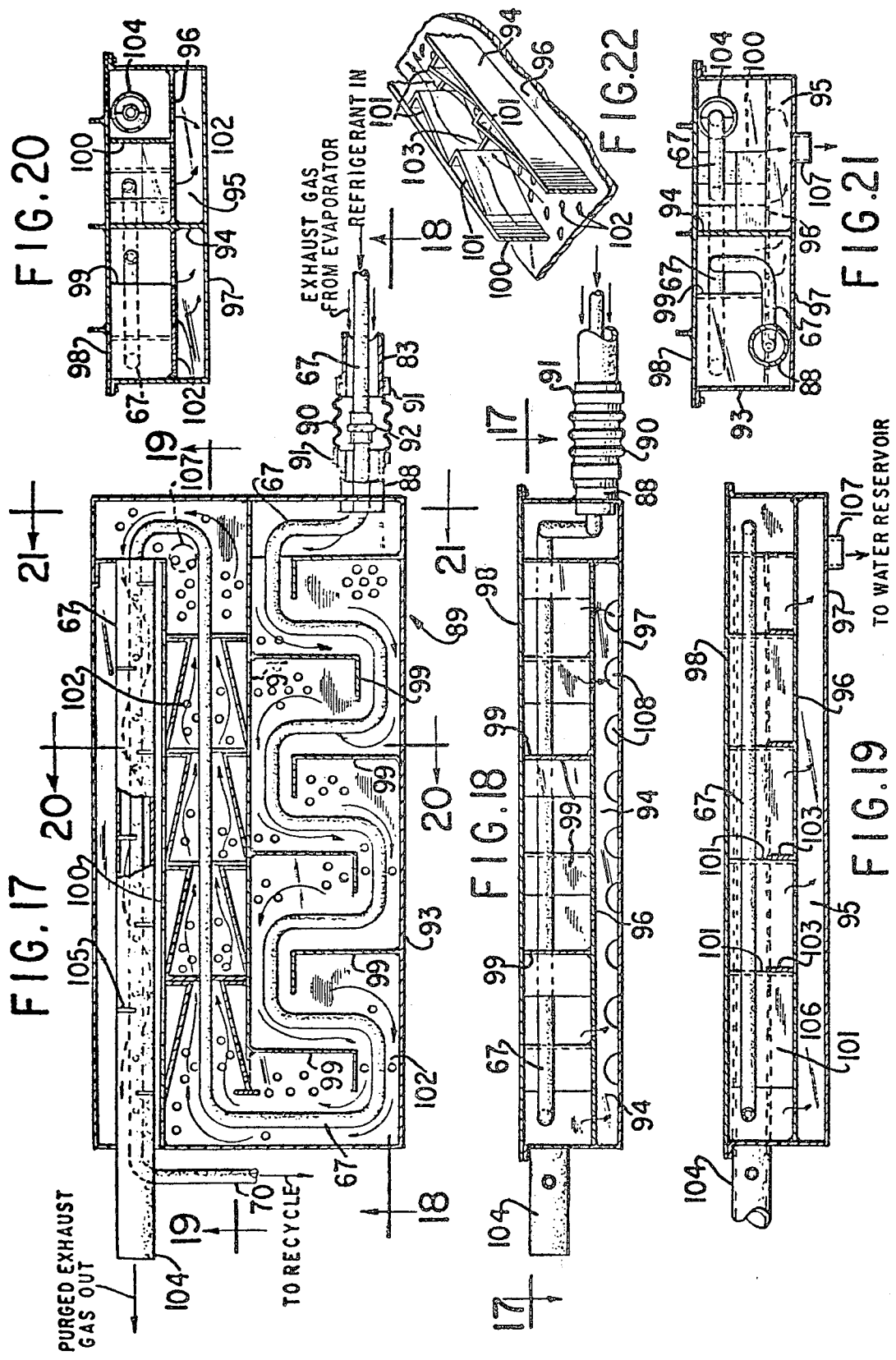

METHOD AND APPARATUS FOR PURIFYING COMBUSTION GASES

This is a continuation-in-part application of application Ser. No. 131,037 filed Apr. 5, 1971 for METHOD AND APPARATUS FOR PURIFYING COMBUSTION GASES in the name of SIGMUND L. ROSS AND OSCAR SHUFFMAN. Said U.S. application Ser. No. 131,037 is a continuation-in-part of application Ser. No. 42,622 filed June 2, 1970 by the same inventors both abandoned.

This invention relates to the removal of atmospheric pollutants from waste combustion gases and the recovery of useful products therefrom. The invention is of particular utility as a pollution control device for installation on vehicles propelled by an internal combustion engine.

Internal combustion engines employed in motor vehicles are a principal source of atmospheric pollution. The pollutants occur in a variety of different forms. Thus, one of the pollutants is in the form of unburned carbon particles. The direct products of combustion include carbon dioxide, carbon monoxide and water. Carbon dioxide is harmless but carbon monoxide has known toxic properties. Another major pollutant is the sulfur dioxide that is contained in waste combustion gases. In addition, there are other pollutants such as oxides of nitrogen, lead compounds, aldehydes, irritant gases and a variety of unburned petroleum hydrocarbons. There is an urgent need for the removal of or reduction in the amount of noxious pollutants in waste combustion gases. To this end many proposals have been offered. Thus it has been proposed to chill products of combustion passing through the exhaust pipe of an internal combustion engine for an automobile sufficiently to condense unburned hydrocarbons and any water vapor contained in the products of combustion. However, the only reduction in pollutant content is that which is afforded by the condensation of unburned hydrocarbons. The removed unburned hydrocarbons are separated from the condensed water and are returned to the intake of the engine. The separated water is bled out of the system. In a system of this type the bulk of the pollutants other than the unburned hydrocarbons emerge from the tail pipe. It also has been proposed to employ chemical reagents employed in an aqueous medium, the aqueous chemical reagents being recirculated into contact with the exhaust gases. However, the chemical reagents have to be replenished and their efficacy is questionable. It also has been proposed to employ catalysts to induce chemical reactions which tend to diminish the content of pollutants. However, such catalysts are specific to specific pollutants and have not proved to be sufficiently effective to go into commercial use. While these and other proposals have been made, the automotive industry is still seeking a practical and effective way of overcoming or minimizing the pollution problem presented by the exhaust of internal combustion engines used in motor vehicles.

The principal object of this invention is to effectively and by practical means remove or greatly reduce the amount of atmospheric pollutants which occur in the exhausts of internal combustion engines or other waste combustion gases.

It is a further object of this invention to remove the objectionable pollutants in a form that is useful by reason of its high content of carbon in a form having utility as a source of activated carbon and of carbon black.

In accordance with this invention, waste combustion gases are directed into direct and intimate contact with the surface of ice in the manner and with the effect on pollutants hereinafter described. This ordinarily is accomplished by the provision in a confining chamber through which exhaust gases are passed over a body of ice having an extended surface so that the gases while confined flow through an elongated zone of travel in turbulent contact with the ice. Because of the occurence of the ice in this chamber the chamber in which the ice is formed is referred to for brevity as the "ice contact chamber". The body of ice may be conveniently formed so as to provide an extended area of ice surface by the use of out-of-contact thermal exchange means which provide a subsurface on which the ice is formed and which may be disposed in any configuration which may be desired. For example, the out-of-contact thermal exchange means which presents the subsurface may be in the form of one or more coils of tubing through which a refrigerant is passed at a temperature sufficiently low to cause the condensation of moisture in the combustion gases on the surface thereof and, in addition, the freezing of the condensed moisture so as to form a substantial body of ice supported by the coils of the thermal exchange means. In order to assist in bringing the combustion gases into intimate turbulent contact with the surface of the ice, successive baffles preferably are employed which direct the gases repeatedly into turbulent contacts with surfaces of the ice whereby the gases are more effectively scrubbed free of pollutants by contact with the ice surface.

The scavenging effected by the scrubbing action of the ice has been found to be extremely effective. Gases such as sulfur dioxide, oxides of nitrogen and carbon monoxide are effectively removed. Likewise lead salt residues from tetraethyl lead. Solid particles also are removed, including more especially carbonaceous particles and likewise unburned hydrocarbons and residues thereof. So far as is known, these results have not heretofore been obtained in a practically feasible manner.

The means for refrigerating the thermal exchange means may utilize the conventional air conditioning equipment which is used in many motor vehicles. In such case the conventional refrigerating equipment may be utilized both for the purpose of providing air conditioning for the interior of the body of the motor vehicle and as providing a source of refrigerant for use in the exhaust gas purifying means of this invention.

While it may appear on first impression that the maintenance of a body of ice in the exhaust system of an internal combustion engine is far fetched from the standpoint of being something which might practically be done in the case of a conventional automobile, for example, it now has been found that this invention not only is effective but also is economical and practical. In fact, all that is required in order to maintain the necessary refrigeration load is a compressor comparable to the type of compressor conventionally employed for use in air conditioning a conventional air conditioned automobile, namely, a compressor of the order of one-quarter or one-third horsepower.

It also is a feature and advantages of this invention that it lends itself to utilization in the type of exhaust system of a conventional automobile either in conjection with a conventional muffler or as a muffler which has embodied therein the capability, pursuant to this invention, of a highly effective elimination of the pollutants ordinarily encountered in the exhaust gases of an internal combustion engine. Accordingly, this invention provides a practical solution of the problem of removal of pollutants from the exhaust gases of the internal combustion engine of an automobile with very little modification of existing equipment.

The present invention also is unique in that it provides a source of useful carbonaceous recovered material.

During the period immediately after starting the internal combustion engine of a motor vehicle, for example, the exhaust gases flow into direct contact with the refrigerated surface of the thermal exchange means that is utilized according to our invention and, as aforesaid, the moisture content thereof condenses and freezes and builds up a substantial body of ice on the surface of the thermal exchange means which then becomes a subsurface for supporting the body of ice that provides the surface for contact with the exhaust gases during continued operation of the engine.

After the body of ice has been formed it has been found that the ice is extremely effective in causing the deposition of solid particles such as particles of unburned carbon. This is highly significant for these are necessary in providing freezing nuclei, for while liquid and gases can act as condensation nuclei in the atmosphere only solid particles serve as freezing nuclei for promoting the formation and buildup of ice to form the ice bed. The deposited particles coupled with the chilling effect of the ice serves to condense additional moisture with the creation of a condition wherein the condensed moisture in excess of that which freezes in the form of ice sloughs off the ice surface, carrying with it the particulate matter deposited on the ice surface. Moreover, the capacity to take up gaseous pollutants increases markedly as the temperature is reduced and the sloughed off water which is at the low temperature of melting ice and the particulate matter serve in a highly effective manner in absorbing noxious gases and in taking up condensed liquids such as unburned hydrocarbons, salts and other compounds. As used herein, the reference to gaseous pollutants includes unburned hydrocarbons as well as gases such as sulfur dioxide and oxides of nitrogen. The deposited material that is formed is in the nature of a moist sludge which as it continues to be formed gradually sloughs off the surface of the ice and is of such nature that it is removable from the ice contact chamber. Such removal is ordinarily assisted by the flow of residual combustion gases through the ice contact chamber in a manner which promotes gradual flow of the sludge out of the ice contact chamber and into a collection container.

The formation of the body of ice in the ice contact chamber comprised in the refrigerant evaporation zone of the system is of critical importance in the practice of this invention. Whether the ice as formed is continuous or discontinuous is immaterial so long as an extended area of ice surface is provided for establishing direct contact of the ice with the exhaust gases and the exhaust gases are caused to flow in contact with the ice surface through an elongated or extended zone of travel during which the gases are subjected to continued scrubbing as they travel along so as to enhance the effectiveness of the scavenging action.

While this invention is not to be regarded as dependent on the correctness of any theoretical considerations mentioned herein in explanation of the effectiveness with which pollutants may be removed from waste combustion gases, the high degree of effectiveness of this invention in removing pollutants from exhaust gases involves the phenomenon that when ice is formed from freezing water it becomes naturally endowed with an electrostatic charge. The moving stream of exhaust gases as a result of its movement relative to the ice also acquires an electrostatic charge which is opposite to that of the ice, with the result that there is electrostatic attraction which promotes the capture on the wet ice surface of suspended particulate matter. The electrostatic attraction is supplemented by the thermal precipitation effect which is induced by the travel of the exhaust gases through a zone where there is a temperature differential between the cold ice surface in contact with the gases and a zone of higher temperature wherein the greater molecular activity by its directional bombarding differential urges the particulate matter toward the colder surface with incidental consolidation of attracted particles and droplets that contributes to their deposition on the ice surface. The attraction toward and deposit on the ice surface also is assisted by turbulence induced by baffles with resultant enhanced ionization of the gases. By causing the exhaust gases to travel while confined through an elongated zone of travel in contact with the surface of the ice, the aforesaid combined influences are utilized and have a very high degree of effectiveness in thoroughly scrubbing and scavenging the various pollutants from the exhaust gases. Furthermore, because the condensing water vapor utilizes the suspended particulate matter as nuclei on which to condense, because of the lowering of the temperature and the lessening of kinetic energy of the moving gas stream, and because of the occurrence of the increase in particle weight caused by the condensation of water thereon the particulate matter attracted to and captured on the ice surfaces eventually sloughs off assisted by the scrubbing and eroding action of the moving stream of the exhaust gases along the surfaces of the body of melting ice. In addition, because dissolved gases separate out of solution upon freezing with formation of bubble inclusions in and on the ice and because dissolved salts tend to concentrate at crystal boundaries, the combined action of capture and sloughing off of chemical as well as particulate pollutants is that of a concentrator whereby the pollutants are caused to become concentrated in the sludge. The result is the formation of a moist sludge which contains the pollutants and which can readily be handled and stored for ultimate disposal. More specifically, the sludge in the embodiment herein disclosed reaches the bottom of the portion of the ice contact chamber wherein it is formed and becomes separated from the residual exhaust gases. The accumulating sludge also lends itself to being moved out of the ice contact chamber and its removal preferably is assisted by moving the sludge out through an opening through which the residual exhaust gases are emitted so that the kinetic energy of the moving gases will increase the rate of removal of the sludge from the ice contact chamber.

As the particulate matter is captured and sloughed off the ice surface in the form of a sludge the noxious gases and vapors entrained in the exhaust gases as the temperature of the exhaust gases becomes lowered as aforesaid become increasingly soluble in and miscible with the condensing water vapor, and under the conditions prevailing in the ice contact chamber the removal of gaseous and vapor pollutants is accomplished in a highly effective manner so as to be carried down with the sludge and removed from the residual exhaust gases along with the sludge.

It is a further feature of this invention that the sludge which is formed in the ice contact chamber is removed into a collection container wherein it is permitted to accumulate. When a sufficient amount of accumulated sludge has built up to warrant doing so, the accumulated sludge may be removed from the collection container. This may be readily accomplished as by blowing it out of the collection container with compressed air. The operation is a simple one which can be taken care of whenever necessary at a garage or service station.

It is a further feature of this invention that as the sludge gradually accumulates in the collection container the stream of residual exhaust gases is directed so as to sweep over the surface of the cool, damp sludge. By this action and as the accumulation is being built up the carbon captures gaseous and condensed pollutants and likewise is subject to physical and electrostatic influences whereby it is molecularly modified to a form that lends itself to the production of activated carbon or carbon black. Since the sludge which is removed from the collection container is rich in modified carbon, the sludge has substantial commercial value for a variety of industrial uses.

Preferably the collection means is such that there is reduction in pressure and in this zone of reduced pressure further ice contact is provided. The reduction in pressure, which preferably is repeated with indicental lowering of the temperature of the reduced exhaust gas, provides conditions conducive to the ultimate removal of such small quantities of pollutants as may be present in the exhaust gases removed from the primary ice contact chamber. The concommitant ice formation and sloughing off also occurs in the collection unit or zone of the system and the resulting sludge supplements that carried into the collection zone from the ice contact chamber.

In one embodiment the residual exhaust gases which are swept over the sludge in the collection chamber are caused to pass through a screen which provides further assurance that particulate, solid pollutants are removed from the exhaust gases. However, in another embodiment this objective is obtained by the employment of zones of pressure reduction and baffles.

As a result of utilizing the foregoing in the practice of our invention a very effective removal of noxious contaminants has been accomplished. The bulk of the residual exhaust gases merely consists of nitrogen, carbon dioxide and residual oxygen.

A further understanding of this invention and of the features and advantages thereof will be apparent in connection with the following description of preferred practice of this invention in connection with the accompanying drawings wherein:

FIG. 3 is a side elevation, partly in section, of the ice contact chamber;

FIG. 4 is a side elevation of the refrigerant coil arrangement shown in FIG. 3, with part of the larger diameter coil removed for purposes of clarity;

FIG. 5 is an end view of the refrigerant coils shown in FIG. 4;

FIG. 6 is a section on the line 6—6 of FIG. 3 with the refrigerant coils removed and showing the arrangement of baffles in the ice contact chamber;

FIG. 7 is a side elevation, partly in section, of the collection container;

FIG. 8 is an end view of the inlet end of the collection container;

FIG. 9 is a section taken on the line 9—9 of FIG. 7;

FIG. 10 is an end view of the exhaust end of the collection container;

FIG. 12 is a plan view, with certain parts broken away, of the evaporator zone or unit employed in the system shown in the flow diagram of FIG. 11;

FIG. 13 is an elevation of the right-hand end of the unit shown in FIG. 12;

FIG. 14 is a plan sectional view of the evaporator unit taken on the line 14—14 of FIG. 13 with the outer casing removed;

FIG. 15 is a detail view, partly in section, taken on the line 15—15 of FIG. 12;

FIG. 16 is a detail elevation, partly in section, taken on the line 16—16 of FIG. 14 which shows the disposition of the baffles in the ice contact chamber;

FIG. 17 is a plan view of the collection unit or zone employed in the system shown in FIG. 11 taken on the line 17—17 of FIG. 18;

FIG. 18 is a sectional elevation of the collection unit taken on the line 18—18 of FIG. 17;

FIG. 19 is a sectional elevation taken on the line 19—19 of FIG. 17;

FIG. 20 is a sectional elevation taken on the line 20—20 of FIG. 17;

FIG. 21 is a sectional elevation taken on the line 21—21 of FIG. 17; and

FIG. 22 is a perspective detail of the portion of the collection unit which comprises successive constriction and expansion zones in the travel of the exiting exhaust gases.

Figure 1:
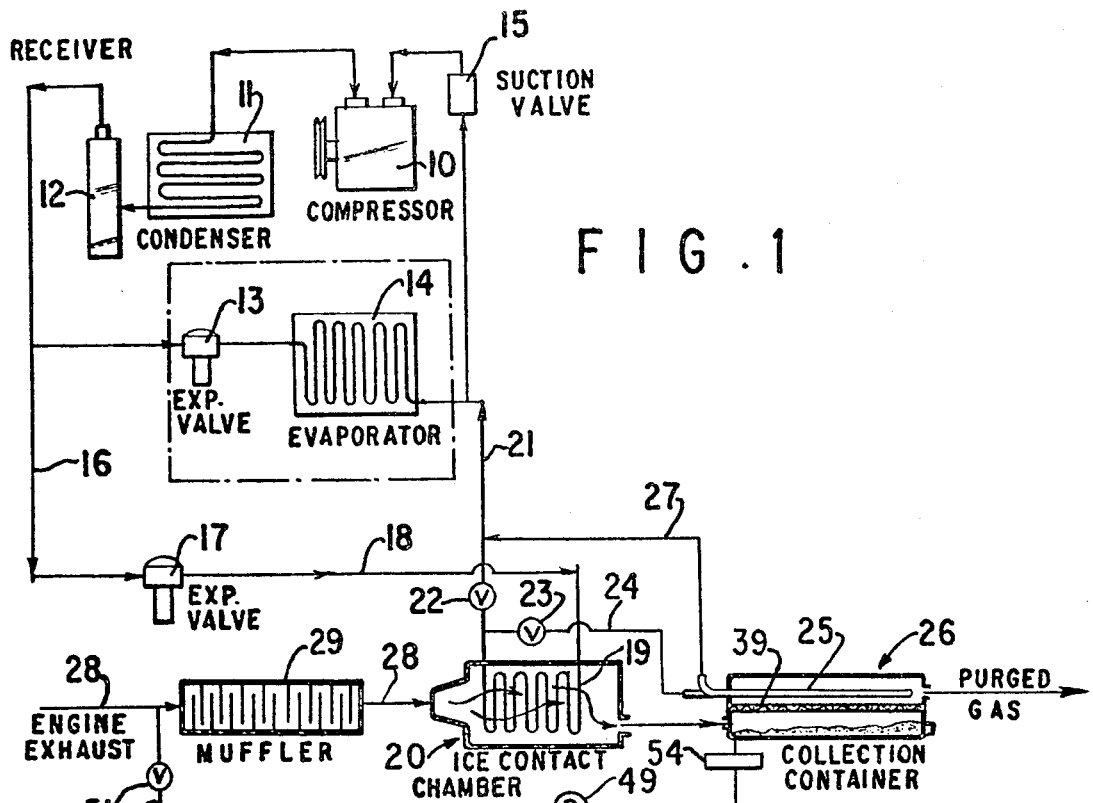
FIG. 1 is a flow diagram illustrating the utilization of one embodiment of our invention in the exhaust system of a motor vehicle comprising conventional refrigerating means of a type employed for air conditioning.

With reference to the flow diagram shown in FIG. 1, a conventional refrigerating system or unit is indicated which comprises the compressor 19, the condenser 11, the receiver 12, the expansion valve 13 and the evaporator 14. The cold, expanded refrigerant passes from the evaporator to the suction valve 15 for return to the compressor 10. In the diagrammatic showing of FIG. 1 expansion valve 13 and the evaporator 14 are part of the air conditioning equipment of a motor vehicle.

The relief valve and evaporator for such air conditioning equipment may optionally be employed in the practice of our invention. It is optional equipment which may or may not be employed when utilizing our invention.

In the practice of our invention the compressed refrigerant, such as freon, is directed from the receiver 12 by the line 16 to the expansion valve 17 and the refrigerant under reduced pressure is directed by the line 18 to the evaporator coil 19 in the ice contact chamber 20. The spent refrigerant may be returned to the suction valve 15 by the line 21. However, in optional preferred practice of this invention the valve 22 in the line 21 is closed and the valve 23 in line 24 is open for directing the residual and still cold refrigerant through the refrigerated coil 25 in the upper portion of the collection container 26 from which the spent refrigerant is returned by the line 27 for reintroduction into the line 21 for return to the suction valve 15. When the system is employed without using the coil 25, valve 22 is open and the valve 23 is closed or the coil 25 and lines 24 and 27 may be omitted altogether.

Figure 2:
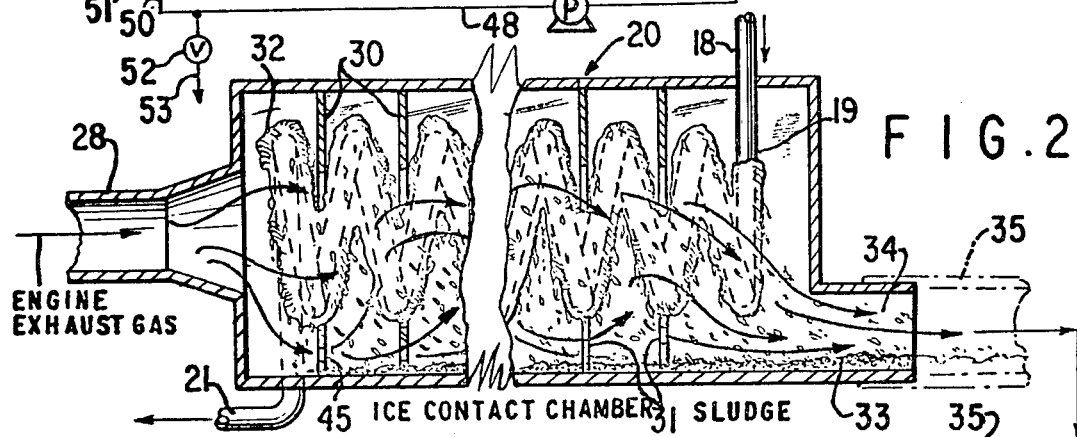
FIG. 2 is a schematic showing of the evaporator section or zone which comprises the ice contact chamber and of the collection container comprised in the collection zone and of the flow of material therethrough.

As further indicated in FIG. 1, the purifying means of this invention is positioned downstream in the exhaust line 26 leading from the internal combustion engine in the portion thereof subsequent to the muffler 29. To assist in the preliminary cooling of the exhaust gases prior to entry into the purifying means of our invention the surface for heat transfer to the surrounding atmosphere may be increased by conventional means such as by the employment of a relatively large diameter exhaust line and the employment of cooling fins of conventional design (not shown). The purifying action which is accomplished in the practice of our invention is indicated schematically in FIG. 2. In FIG. 2, the structural details are not shown, especially in connection with the coils. The structural details of the coils are shown in FIGS. 3 to 10.

In FIG. 3, the eshaust gases are shown entering the ice contact chamber from the exhaust pipe 28. Because of the greatly increased cross-sectional flow capacity and the employment of baffles 30 and 31 the kinetic energy of the moving exhaust gases is greatly reduced and the exhaust gases are directed into intimate, direct contact with the surfaces of the refrigerated coil 19. The refrigerant is introduced into the coil from the line 18 and, as shown schematically in FIG. 2, it flows from the coil via the line 21. The effect of the expansion and evaporation of the refrigerant is such as to maintain the temperature of the surface of the coil 19 at a temperature so low as to not only cause condensation of moisture contained in the exhaust gases but also the build-up of a body of ice 32 on the subsurface afforded by the surface of the coil 19. Upon continuing operation a condition of equilibrium is attained wherein the surface of the body of ice 32 is scrubbed by the incoming gases with continued condensation of water vapor and deposition of particular matter on the ice with formation of sludge which, as shown schematically in FIG. 2, sloughs off and falls to the bottom of the ice contact chamber 20 carrying with it absorbed noxious gases, vapors, salts and condensed liquids. The accumulated sludge in the bottom of the ice contact chamber is indicated at 33. The central portion of the baffles 31 adjacent the bottom of the ice contact chamber is cut away, as shown in FIG. 6 and described more in detail hereinbelow, so as to permit the sludge under the influence of the kinetic energy of the rapidly moving exhaust gases to flow out of the ice contact chamber through the outlet orifice 34. It is apparent that the exhaust gases are directed through the longitudinal extent of the ice contact chamber with a zigzag course that is imposed by the baffles 30 and 31 and that follows the course of the individual coils. In this ay an elongated zone of travel of the exhaust gases in direct turbulent contact with the ice on the coil is afforded where the above-described influences result in effective deposition of the pollutants and the concomitant sloughing off of a sludge wherein the various pollutants are concentrated.

The outlet 34 of the ice contact chamber is shown schematically in FIG. 2 as connected by a suitable line or hose 35 to the inlet 36 of the collection container 26 wherein a body of sludge 37 gradually builds up, as indicated in FIG. 2, until enough has accumulated to warrant its removal.

When it is desired to clean out the sludge from the collection container this may be readily accomplished by removing the readily removable closure 38 whereupon the sludge may be removed as by scraping it out or by the use of compressed air.

Within the collection container the exhaust gases are swept over the surface of the sludge as it gradually accumulates in the collection container, as indicated by the arrows in FIG. 2. Before leaving the collection container the residual exhaust gases pass through the screen 39 which, as aforesaid, provides additional assurance for the capture of any particulate matter. Moreover, and as aforesaid, the refrigerant coil 25 in the upper portion of the collection container by its cooling effect provides additional assurance of retention of pollutants absorbed in the sludge and on the surfaces of particles captured by the screen 39. The residual exhaust gases which now have been purified are passed into the atmosphere through the outlet 40.

The details as regards the construction of the ice contact chamber are shown in FIGS. 3, 4, 5 and 6. The ice contact chamber 20 in the specific embodiment shown is cylindrical. The exhaust line 28 is connected to the forward end 41 with the interposition of the flared portion 42 which assists in decelerating the exhaust gases and distributing them throughout the cross-section of the chamber. The chamber itself, for convenience in assembling, is made in two halves, namely, the upper half 20A and the lower half 20B, that are secured in complementary opposed relation by the strips 43 which are secured to and are upstanding from the lower half 20B and to which the lower margins of the upper half 20A may be secured as by set screws 44. Depending from the inner surface of the upper half 20A and secured thereto are the aforesaid baffles 30 which are shaped and positioned, as shown most clearly in FIG. 3, so as to conform to the configuration between the spaces between the individual coils of the larger coil 19A of the concentric coils 19A and 19B which make up the coil 19.

In similar fashion, the baffles 31 are secured to the inner surface of the lower half 20B of the ice contact chamber except that each of the baffles 31 has the cut-out portion 45 in the region thereof immediately above the bottom of the ice contact chamber. The baffles 30 and 31 serve to direct the exhaust gases in immediate direct contact with the ice on the surface of the coils 19A and 19B. Any sludge which sloughs off from the body of ice on the surface of the coils 19A and 19B falls to the bottom of the chamber 20 and with the assistance of the rapidly moving exhaust gases is urged along the bottom of the chamber 20 through the openings afforded by the cut-out portions 45 of baffles 31 for exit along with the residual combination gases through the exit opening 34.

As shown in particular in connection with FIGS. 4 and 5, the refrigerant which is introduced into the coil 19 through the line 18 first travels through the larger evaporator coil 19A from adjacent the outlet end of the ice contact chamber to adjacent the inlet end. The refrigerant then travels through the centrally disposed line 46 to the end of the smaller evaporator coil 19B and travels therethrough for exit into the return line 21 adjacent the end of the ice contact chamber here the exhaust gases are introduced.

The detail of the collection container is shown in FIGS. 7 8, 9 and 10. The residual exhaust gases emanating from the outlet 34 of the ice contact element chamber travel through the connecting line or hose 35 to the inlet 47 of the collection container 26. The collection container is horizontally disposed and is of sufficient diameter and length to permit a substantial quantity of sludge 37 to accumulate therein. The outlet 40 of the collection container is at the opposite end thereof so that the incoming gases sweep over the accumulating sludge, as indicated by the arrows. It is preferable according to this invention that the collection container be provided with the screen 39 through which the exhaust gases pass in flowing toward the outlet 40.

While it is not essential to the practice of this invention, it is preferable that an out-of-contact thermal exchanger be disposed in the upper portion of the collection container so as to maintain the residual exhaust gases in a cool condition favorable to the retention of noxious pollutants in the sludge that is collected in the collection container. In the embodiment shown in the drawings the thermal exchanger may begin the form of the U-shaped tubing 25 connected by the lines 24 and 27 to the refrigerant return line 21 whereby, upon closing the valve 22 and opening the valve 23, refrigerant that is discharged from the coil 19 of the ice contact chamber may be caused to flow through the tubing 25 before return to the suction side of the compressor.

The amount of water vapor in waste combustion gases may vary and in the event of the occurrence of sufficient free water in the ice contact chamber and in the collection container it is in accordance with preferred practice of this invention to return free water by a return line to the exhaust line at a point prior to the ice contact chamber and preferably to a point on the exhaust line ahead of the muffler. The provision of such a return line is shown diagrammatically in FIG. 1 by the line 48 which has its inlet adjacent the forward end of the collection container 26 and which contains a small pump 49 of conventional design, which may be operated from the battery of the motor vehicle, whereby the water is pumped so as to be returned by line 50 into the exhaust line, preferably in the form of a spray, when the valve 51 is open and the valve 52 in line 53 is closed. This has the advantage of assisting in the cooling of the exhaust gas whereby ice formation in the ice contact chamber may be accomplished more efficiently. Moreover, the additional water which is recirculated through the ice contact chamber adds to the efficiency with which pollutants are taken up on the ice surface and sloughed away into the collection container. If the water collection becomes excessive the excess water may be removed by opening valve 52 in line 53. Line 53 may be directed to waste or, alternatively, may be directed into the cooling system of the vehicle. It is preferable to withdraw the water through a filter 54, especially when excess water is directed to waste through line 53.

Moreover, the production and recovery of carbon as herein described, wherein unburned carbon particles are collected which may have residual hydrocarbons associated therewith and lwhereby the particles as they are collected are contacted with the residual combustion bases which contain oxygen and carbon dioxide and other substances having an influence on the activity of the carbon surface, especially when the carbon particles are moist, has other and more general application.

A further embodiment of this invention is shown in FIGS. 11-22. The evaporator and collection units or zones, which units successively scavenge pollutants from the exhaust gases and collect the scavenged pollutants so that they are not discharged into the atmosphere, are shown comprised in the flow diagram of FIG. 11. In this flow diagram the evaporator unit and the collection unit are disposed in succession downstream of the exhaust line 60 which has the muffler 61 therein. The refrigeration system is conventional in that it comprises the compressor 62, the condenser 63, the receiver 64 from which compressed refrigerant such as freon is taken by the line 65 to the expansion valve 66. The cold refrigerant is taken from the expansion valve 66 by the line 67 into the evaporator unit which is indicated generally by the reference character 68. The refrigerant successively passes through the evaporator unit and the collection unit, as will be described in detail in connection with FIGS. 12-22. The refrigerant after emerging from the collection unit is returned to the suction valve 69 by the line 70 and passes from the suction valve 69 to the compressor by the line 71.

The evaporator unit 68 comprises a preferred embodiment of the ice contact chamber. In this embodiment the refrigerant line 67 is disposed in a coil of the zigzag type wherein the several straight portions are surrounded in proximate spaced relation with respect thereto by elongated conduit means which may conveniently consist of lengths of pipe roughly corresponding in diameter with the diameter of the exhaust pipe. More specifically, the portion of the exhaust line 72 which is downstream of the muffler enters the casing 73 of the evaporator unit 68 and extends from the right-hand extremity of the unit substantially to the left-hand extremity. Just prior to the entry of the exhaust line 72 into the casing 73 the refrigerant line 67 enters the exhaust line and extends from right to left concentrically with the exhaust line 72. It is maintained in this position by the supporting baffles 74.

The left-hand extremity of the exhaust line 72 terminates in a header 75 which directs the exhaust gases so as to enter and pass through the tubing 76 proceeding from left to right in the annular space surrounding the continuation of the refrigerant line 67. The header 75 may be united with the exhaust line 72 and the tubing 76 in any suitable manner such as by welding. Similarly, the Ushaped portion 77 of the refrigerant line 77 may be secured in place with respect to the straight reaches of the refrigerant line 67 by welding. This manner of assembly may also be employed in connection with the other corresponding parts of the unit. The tubing 76 discharges into the header 78 which serves to direct the exhaust gases into and through the adjoining tubing 79 within which a further reach of the refrigerant line 67 is concentrically disposed. Another header 80 directs the exhaust gases into and through the tubing 81 wherein another reach of the refrigerant line 67 is concentrically disposed and the header 83 directs the exhaust gases into the tubing 83 for passage therethrough in relation to the continuation of the refrigerant line 67 that is concentrically disposed therein. The disposition of the exhaust line 72 in relation to the refrigerant line 67 and the header 75 is shown in FIG. 15. FIG. 16 shows the disposition of the baffles 74 in the exhaust line 72 and the way by which the refrigerant line 67 is held in concentric relation with respect to the exhaust line 72, it being understood that there is a plurality of baffles 74 alternately disposed on opposite sides of the refrigerant line 67. As exemplified above, the term "coil" as used herein is not limited to a helical coil but has application to zigzag and other configurations by which a substantial longitudinal extent of travel may be afforded in a limited space.

The casing 73 comprises the oval portion 84 which may be made of sheet metal, plastic or other appropriate material and which is secured to the end panels 85 and 86 through which the exhaust line and the discharge tubing 83 pass at opposite ends thereof. The casing 73 serves to protect the ice contact chamber from possible damage due to flying stones or the like. It also shields the ice contact chamber from heat from the road. The casing 73 preferably is of oval shape in general conformity to the conventional oval shape of the mufflers commonly used in automobiles. However, the casing could be any other convenient shape, such as rectangular, square or circular.

The scavenging action which takes place in the evaporator unit is similar to that which has been described hereinabove in connection with the embodiment of this invention shown in FIGS. 1-10. However, the construction of the ice contact chamber as illustrated in FIGS. 12-15 is preferred in that the construction is such as to take more efficient advantage of thermal precipitation in causing the pollutants in the exhaust gases to become deposited on the body of ice within the ice contact chamber. The refrigerant that enters the evaporation unit is at a temperature sufficiently low as to cause not only condensation of water vapor contained in the exhaust gases but also the freezing of the condensed water vapor on the surface of the refrigerant line 67 with the build-up thereon of a body of ice which presents an extended surface area that is in contact with the exhaust gases in their zone of travel through the exhaust line 72, the tubings 76, 79, 81 and 83 and the headers 75, 78, 80 and 82. The body of ice adhering to the exhaust line 67 is shown in FIG. 12 by the reference character 87. For the sake of clarity, the body of ice 87 has been shown only in FIG. 12 and only in a single location in said figure. However, it is to be understood that the body of ice which builds up extends throughout the entire length of the refrigerant line 67 that is within the casing 73.

Our invention takes advantage of the enhanced scavenging action afforded by thermal precipitation. In a thermally and electrically uniform gas the molecular bombardment of particular material is uniform in all directions. By providing a cold refrigerated surface in proximate spaced relation to a warmer zone such as that provided adjacent the warmer surface presented to the exhaust gases by the inner surface of the exhaust line 72, it follows that in the tubing sections 76, 79 and 83 and the headers 75, 78, 80 and 82 the temperature gradient is such as to tend to cause deposition on the colder surface. Thus the moisture close to the refrigerant line 67 condenses on the surface thereof and freezes. The movement of the exhaust gases relative to the chilled surface also tends to create ionization and electrostatic charges which promote condensation into droplets which in turn become deposited on the chilled surface and freeze. Gaseous pollutants contained in the exhaust gases become absorbed in the chilled condensate and this is promoted by reason of the fact that such absorption or solution is increased as the temperature decreases. The chilled condensate containing absorbed gaseous pollutants then, because of the thermal precipitation conditions, tend to move to the refrigerated surface where they become entrapped by the ice. As the exhaust gases move through the annular space between the refrigerant line and the exhaust line or other tubing the influences to which the exhaust gases are subjected, including the influences afforded by the baffles 74, are such that the electrostatic charges which become imposed on the gaseous and particulate materials are subject to repeated reversals with the result that oppositely charged units of matter inevitably become adjacent and attracted to each other so as to become condensed and deposited on the surface of the ice. The resultant electrostatic precipitation effect is more comprehensive than an electrostatic precipitator since an electrostatic precipitator depends on a single fixed charge and the precipitation of those components only that are precipitated responsive to said charge.

The build-up of ice on the refrigerant line results in some decrease in the cross-section of the ammulus which surrounds the refrigerant line with resultant increase in velocity and decrease in the pressure of the gases. This aids in the scrubbing action without creating back pressure on the engine because the volume of the gas contracts upon cooling during its travel along the ice surface. The ionization of the gases and the creation of turbulence to assist in the scrubbing or scavenging action afforded by the extended area of the ice surface over which the gases flow are promoted by the successive baffles 74.

As has been described in connection with the embodiment shown in FIGS. 1-10, an equilibrium condition eventually is reached at which the movement of the exhaust gases across the ice coating of the refrigerant line erodes the ice crystals with resultant sludging off of a moist sludge which contains the pollutants scavenged from the exhaust gases. This sludge is moved along by the kinetic energy of the moving exhaust gases and this movement is not interfered with by the baffles 74 since the baffles are constructed and positioned so as to leave a zigzag channel along the bottom of the exhaust line 72 and along the bottom of the tubing sections 76, 79, 81 and 83 through which the sludge is moved for eventual discharge from the evaporator unit through the tubing 83. The eroded ice which as either fine or aggregate particles is propelled by the exhaust gases further scavenges the particulate matter from the exhaust gases.

Referring now to FIGS. 17-22, the exhaust gases and the sludge which emerge from the tubing 83 of the evaporator unit 68 are transferred to and enter in the tube section 88 at the entrance of the collection unit, which is indicated generally by the reference character 89. The tubing 83 is shown as maintained in communication with the tube section 88 by a small length of flexible tubing or hose 90 which is clamped in place by clamps 91. The refrigerant line 67 is continued concentrically and for convenience in assembly the portion of the refrigerant line 67 within the collection unit may be detachably joined to the portion of the refrigerant line 67 in the evaporator unit by means of a coupling 92. A hose coupling 122, which may be similar to hose coupling 90, preferably is positioned in exhaust line 72 between the muffler and the evaporator.

The tube section 88 discharges into the interior of a collection unit and the initial travel is from right to left in the space between the side wall 93 and the partition 94. Except for the extreme right-hand end of the collection unit, there is a reservoir 95, the roof 96 of which is spaced substantially above the bottom 97 of the collection unit. In the region between the top 98 of the collection unit and the roof 96 of the reservoir, baffles 99 are disposed in conformity with the serpentine configuration of the refrigerant line 67 in that portion thereof which extends from right to left of the collection unit immediately after the tube section 88 enters the collection unit. The roof of the reservoir in this portion as well as in other portions of the collection unit is provided with a multiplicity of holes 102 and as the exhaust gases enter the above-described portion of the collection unit sludge which is being swept along by the combustion gases as the sludge that enters the collection unit tends to become deposited due to the greatly enlarged flow capacity of this portion of the collection unit as compared with entrance tube 88. Some of the sludge remains on the upper surface of the roof 96 of the reservoir and some of the sludge, including ice crystals, also passes through the holes 102 into the reservoir 95 together with most of the water.

The coil or serpentine of the refrigerant line in this portion of the collection unit performs the function hereinabove described, namely, that of a scavenger. However, in this portion of the over-all system most of the pollutants already have been removed and the function of the ice carried by the refrigerant line is that of removing small amounts of pollutants that had not previously been removed from the combustion gases while at the same time permitting the combustion gases to continue their travel in a greatly purified condition.

In order to further act upon any residual pollutants the exhaust gases are directed through a channel defined by the roof 96 of the reservoir 95, the roof 98 of the collection box, the partition 94 and the partition 100. Within the channel as thus defined there are opposing wall members 101 which provide a succession of gradual contractions and sudden expansions of the gases in moving from left to right. The combination of gradual contractions followed by sudden expansions causes the traveling gases to lose further heat. This action also tends to concentrate any melt water still entrained in the gases. Any water and sludge which tends to be collected and removed from the traveling exhaust gases is free to pass into the reservoir 95 through the holes 102. In order to better assure the drainage of water and sludge through the holes into the reservoir in this portion of the unit wires 103 are disposed in a position that is transverse to the flow of the gas. The weirs also serve to further contract the opening so as to obtain the above-described effect of knocking out pollutants from the stream of combustion gases by accelerating the gases for passage through a restriction and then permitting the gases to expand with resultant cooling effect. The refrigerant line 67 extends from left to right of this portion of the collection unit and any residual moisture tends to condense and freeze thereon so as to provide an ice surface in this portion of the unit and so as to maintain the presence of the ice surface and its scavenging effect on any residual pollutants in the exhaust gases that flow therealong.

The exhaust line 104 extends from adjacent the right-hand end of the collection unit through the left-hand end for discharge into the atmosphere. The refrigerant line is extended therethrough concentrically therewith and contains baffles 105 which are similar to the baffles 74. While at this stage virtually all of the pollutants have been removed from the combustion gases prior to entry of the combustion gases into the exhaust line 104, nevertheless if there is any residual amount of pollutant material in the combustion gases the residual pollutants tend to be collected on the body of ice on the surface of the refrigerant line due to the thermal precipitation effect hereinabove described in combination with the turbulence induced by the baffles 105. Any slight amount of residual aqueous sludge is permitted to drain from the region adjacent the left-hand end of the exhaust line 104 through the holes 106.

The refrigerant having served its purpose leaves the exhaust line 104 through the low pressure return line 70 hereinabove described. The material which drains into the reservoir 95 in the portion thereof between the side wall 93 and the partition 94 is free to migrate to the drain line 107 through the arches 108 in the bottom of the partition 94. The other portions of the reservoir 95 also tend to drain toward the drain line 107 but most of the solid material is left in the collection unit either on the roof of the reservoir or in the reservoir itself.

The drain that drains from the collection unit through the drain line 107 consists largely of water which is permitted to drain into the water reservoir 109 from which it flows through the strainer 112 to the centrifugal pump 113 which forces it through the line 114 to the spray nozzle 115 where it is sprayed into the exhaust gases in the exhaust line 60 prior to their entry into the muffler 61. The end of the reservoir 109 is closed by door 110 hinged at hinge 120 which normally is held in fluid-tight relation by spring 117 so that in the event of freezing the door can open to relieve pressure. The strainer preferably is readily detachable as by the provision of removable hose couplings 118 and 119 similar to hose coupling 90. Wye fittings 120 and 121 are included in the lines 114 and 111, respectively, so as to permit drainage of water from the water recirculation system when the pump 113 is not in operation and thereby eliminate the possibility of freezing in cold weather when the engine is not in operation. The wye fittings function responsive to the velocity of the pumped water to prevent drainage when the pump is in operation while permitting drainage when it is not. The lines adjacent thereto may be slightly inclined so as to drain toward these fittings.

The water which is sprayed into the exhaust gases becomes vaporized and the vaporization of the water tends to cool the exhaust gases. By spraying the water into the exhaust gases it also is the case that sufficient water vapor is maintained in the entering exhaust gases so as to insure the continued presence of a body of ice which coats the refrigerant line throughout the various portions of the system. Since some water vapor is continuously being supplied by the burning of the fuel in the internal combustion engine, the quantity of water tends to build up and if there should be any excess it will drain out of the tail pipe 104. If water is desired in starting up, water may be introduced into the reservoir 109 through the inlet 116 which is provided with a shut-off valve (not shown) that is closed during normal operation. The pump is adjusted so as to provide the normal amount of recirculated water for maintaining the ice in the system during ordinary conditions of operation. The water recirculating system is not essential since the water vapor content of the exhaust gases is around 30 percent and is ample to build up and maintain a body of ice on the refrigerant line.

Eventually, the amount of collected sludge will have become accumulated until it becomes desirable to clean it out. This may be conveniently accomplished by blowing it out with compressed air. Thus after having moved the couplings 90 and 118 out of the way compressed air may be supplied at the tail pipe. Compressed air also may be introduced through the inlet 116. If desired, the bottom 97 of the collection box could be removable. The water reservoir 109 also may be cleaned up swinging open the hinged door 110.

In the operation of an automobile, for example, the engine proper fires at about 1,370° to 1,480°F. while the exhaust at the entrance of the exhaust pipe usually runs from about 350° to 480°F. As the exhuast gas flows in contact with the relatively large area of surface of the exhaust pipe it becomes cooled rapidly and in ordinary operation the muffler of an automobile operates at a temperature of only about 125° to 250°F. The tail pipe extending from the muffler becomes quite cool and its temperature will range from about 80°F. to 150°F.

Since the evaporator unit that is employed in the practice of this invention which contains the ice contact chamber is disposed downstream from the muffler, the exhaust gases by the time they reach the evaporator unit will run at a temperature of about 100°F. If further cooling is desired, the exhaust pipe and/or the muffler may be supplied with air cooling fins of conventional type.

The inherent economy which may be had in the practice of this invention may be illustrated in connection with typical operation of an automobile so that the gasoline comsumption is at the rate of about 18 lbs. per hour. The moisture content of the exhaust gases usually is of the order of 30 percent. In other words, there is about 5.4 lbs. of water produced per hour, or 0.0015 lb. of water per second. Assuming 100°F. as typical of the temperature at which the exhaust gases enter the evaporator unit and assuming that the water content is converted to ice at 10°F. and that the residual gas likewise is cooled to 10°F., the BTUs which have to be withdrawn are approximately 3,345 BTU per second. Since in accordance with accepted engineering practice the removal of 12,000 BTUs per hour equals 1 ton of refrigeration, the refrigeration load under the operating conditions above-described is approximately 0.20 ton per hour. To supply this refrigeration, that which is required according to accepted conversion principles in a compressor of the order of one-quarter to one-third horsepower. This is approximately the horsepower of the compressors that are extensively used for providing the refrigeration in conventional air conditioning equipment in an automobile. It is apparent, therefore, that the refrigeration required is only a very small fraction of the horsepower of engines commonly employed in automobiles and trucks and that the expense incident to the very effective removal of pollutants from the exhaust gases is approximately comparable to that which is incident to the operation of the air conditioning equipment of an automobile.

While this invention has been illustrated in connection with embodiments thereof that are located downstream with respect to a muffler, it also is the case that units embodying this invention may be employed in an exhaust line wherein the muffler is omitted since the travel of the gases within the units is such as in large measure or even entirely to serve the function of a muffler. However, in such case it is preferable to assist in the dissipation of heat from the exhaust pipe by the employment of air cooling fins or the employment of a large diameter exhaust pipe so as to compensate for the omission of the muffler.

Figure 11:
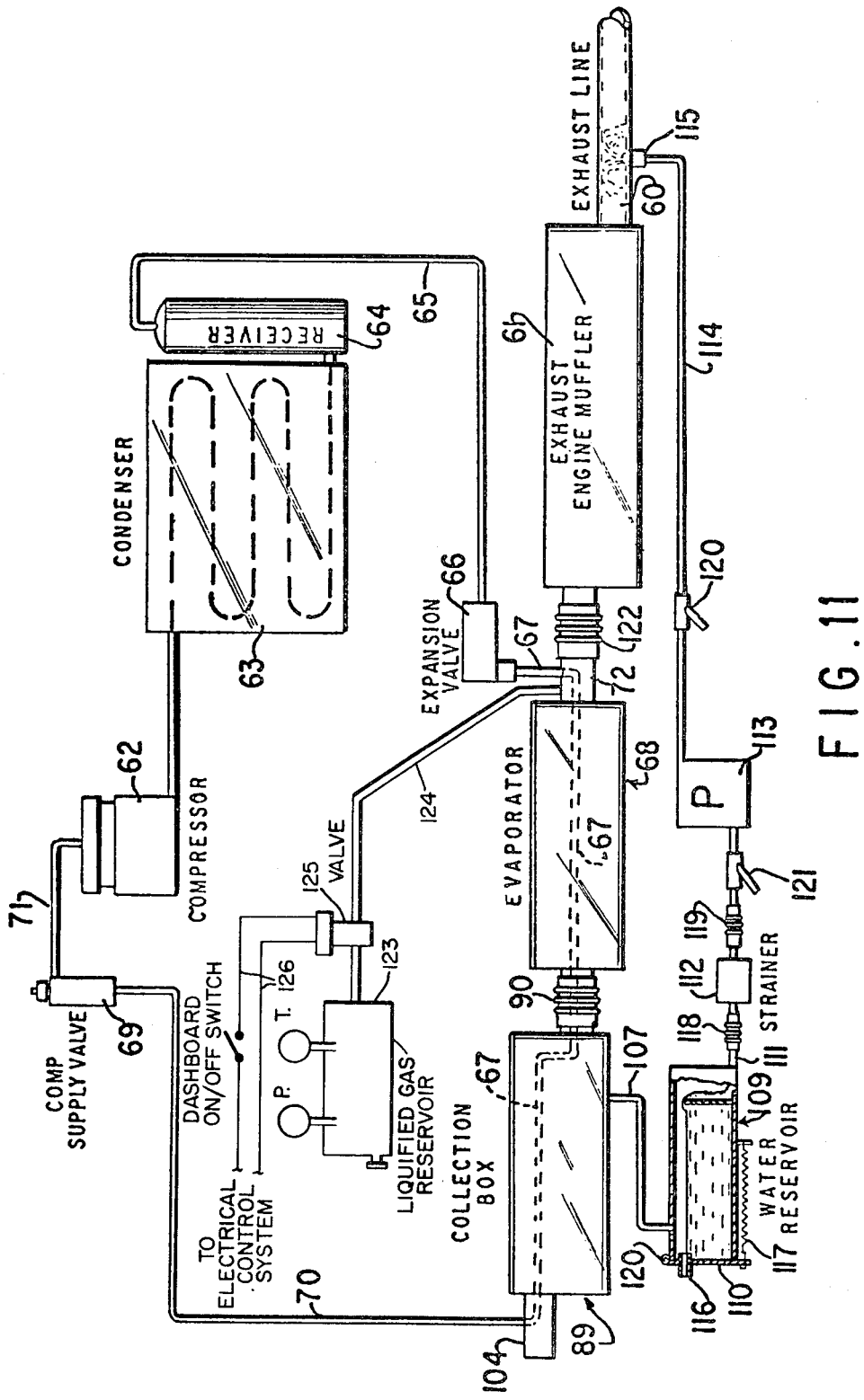
FIG. 11 is a flow diagram which illustrates the utilization of another and preferred embodiment of our invention in the exhaust system of a motor vehicle.

While the evaporator coil 19 of the embodiment of this invention shown in FIGS. 1 to 10 and the refrigerant line 69 of the embodiment shown in FIGS. 11 to 22 become rapidly cooled to ice forming temperature upon starting the internal combustion engine with which these embodiments are respectively utilized it may be desirable in order to minimize the escape of pollutants during the starting up period to introduce a liquid gaseous material, of a type having a sufficiently low temperature when it is permitted to expand rapidly, into the ice contact chamber with rapid reduction in pressure and temperature and concomitant rapid chilling of the subsurface for the ice that is provided as exemplified by the coil 19 or the refrigerant line 67. For example, as shown in FIG. 11 the apparatus may comprise a reservoir 123 for such a liquified gaseous material from which such a liquified gaseous material may be directed into the ice contact chamber 68 by the line 124 which is controlled by the valve 125. The valve 125 may be manually controlled to inject such a liquified gaseous material at the same time that the internal combustion engine is started and preferably is of a known type which automatically shuts off after an injection period of only a few moments. Alternatively the valve 125 may be automatically actuated to inject such a liquified gaseous material when the starter button or key for the internal combustion engine is actuated to start the engine, through control lines 126.

It is to be understood that the apparatus embodying and utilized in the practice of this invention may take forms other than those that have been described merely for purposes of illustration. Moreover, while separate interconnected units have been shown, it is apparent that the assembly may be integrated in a common external casing which, if desired, also could take in a muffler either of conventional type or especially adapted for use with equipment embodying our invention.

We claim:

1. The method of removing pollutants from waste combustion gases which comprises directing the combustion gases into direct contact with a surface of ice which is supported by a heat exchange subsurface and which presents an extended area of ice surface for contact with said combustion gases, flowing said gases while confined by chamber means through an extended zone of travel in turbulant contact with said surface of said ice, maintaining said subsurface at a temperature sufficiently low at which moisture contained in said combustion gases becomes condensed and frozen on said subsurface and builds up thereon a body of ice the surface of which is in direct contact with said gases during their travel through said zone and on which particulate pollutants become deposited and gaseous pollutants become taken up and continuing to direct combustion gases into contact with the surface of said body of ice travelled by said gases with concomitant sloughing off from the ice surface of an aqueous sludge containing pollutants scavenged from said gases by becoming deposited and taken up on said surface, moving said sludge as it is formed and combustion gases into a collection zone, collecting the sludge in a container in said zone, and directing residual combustion gases separated from said sludge out of said zone.

2. A method according to claim 1 wherein movement of said sludge into said collection zone is assisted by the kinetic energy of residual gases in direct contact therewith.

3. A method according to claim 1 wherein the pressure of said exhaust gases is substantially reduced during travel through said travel zone.

4. A method according to claim 1 wherein the waste combustion gases are the exhaust gases of an internal combustion engine.

5. A method according to claim 1 wherein one of said pollutants in the waste combustion gases that is deposited on and sloughed off from said ice surface is in the form of unburned carbonaceous particles and wherein the surfaces of said carbonaceous particles are modified by the action of the waste combustion gases that are swept over the sludge in the collection zone.

6. A method according to claim 1 wherein said body of ice is formed on a subsurface presented by a refrigerant line disposed in proximate spaced relation with respect to the inner surface of elongated conduit means and the combustion gases are passed through said conduit means in direct contact with the surface of the body of ice formed on the surface of said refrigerant line.

7. A method according to claim 1 wherein a liquified gaseous material having a sufficiently low temperature is introduced into said chamber means causing rapid reduction in pressure and temperature within the chamber means and concomitant rapid chilling of said subsurface to the freezing temperature of the moisture contained in said combustion gases.

8. A method according to claim 1 wherein the residual combustion gases are directed through the collection zone so as to pass over said collection container and wherein the so directed residual gases are further chilled by contact with a chilled surface disposed above said collection container.

9. A method according to claim 8 wherein said chilled surface is in the form of ice formed on a subsurface and the subsurface is maintained sufficiently cold to maintain ice thereon.

10. A method according to claim 9 wherein the exhaust gases directed through the collection zone while passing over the collection container in contact with ice on said subsurface are subjected to a succession of pressure drops which assist in completing the scavenging of pollutants from the exhaust gases.

11. A method according to claim 1 wherein prior to contact of the combustion gas with the ice surface water is sprayed into the combustion gas with resultant increase in the water vapor content of said gases that condenses and freezes in the formation of the body of ice presenting said surface.

12. A method according to claim 11 wherein said combustion gases pass through a muffler prior to contact with the ice surface and wherein water is sprayed into the exhaust gases upstream in relation to the muffler.

13. A method according to claim 11 wherein water is separated from the collected sludge and said water so separated is sprayed into said combustion gases prior to contact with the ice surface.

14. Apparatus for purifying waste combustion gases which comprises an ice contact chamber having an inlet and an outlet spaced from said inlet, elongated conduit means within said chamber, means for directing waste combustion gases through said inlet into said chamber, said chamber defining confining means for confining said gases for extended travel of said gases in intimate contact with the external surface of said conduit means during travel through said chamber from said inlet to said outlet, baffle means within said chamber to induce turbulence of said gases during travel through said chamber in intimate contact with said external surface of said conduit means, a refrigerating unit for directing a refrigerant through said elongated conduit means at a temperature sufficiently low to condense moisture in said combustion gases and convert at least a substantial proportion thereof to ice formed on the external surface of said conduit means in direct contact with said gases, continuous channel means comprised in said chamber extending from adjacent said inlet to said outlet, said channel means being disposed underneath said elongated conduit means for the reception therein of liquid and particulate accumulations released from the surface of said elongated conduit means and for travel therealong in the direction of travel of said gases toward and into said outlet, a collection container for said accumulations having an inlet and an outlet, conduit means connected between said chamber and said container which directs waste gases and said accumulations emerging from said outlet of said ice contact chamber into said collection container, said collection container including separating means for the retention of said accumulations therein while permitting the travel of waste gases therethrough from said inlet to said outlet of said collection container for discharge therefrom.

15. Apparatus according to claim 14 wherein said collection container comprises a pressure reducing portion the cross sectional flow capacity of which for waste gases flowing therethrough in relation to that of said inlet of said collection container is such as to result in a reduction in pressure of gases after said gases enter said collection continer through said inlet thereof and which comprises in the region of said portion of said collection container through which gases flow an ice supporting member presenting an extended external surface disposed for contact with said gases prior to emission of said gases from the outlet of said collection container and refrigerating means for maintaining said surface of said member at a temperature sufficiently low to condense thereon water vapor contained in said gases and convert same to ice.

16. Apparatus according to claim 15 wherein said collection container downstream with respect to said pressure reducing portion comprises at least one contraction in the cross sectional flow capacity for said waste gases followed by a further pressure reducing portion wherein the waste gases come in contact with the external surface of said ice supporting member.

17. Apparatus according to claim 14 wherein said means for directing waste combustion gases through said inlet into said chamber comprises spray means for spraying water into said waste combustion gases prior to entry of said gases into said ice contact chamber.

18. Apparatus according to claim 17 wherein said means for directing waste combustion gases through said inlet into said chamber includes a muffler through which said gases pass prior to passage through said inlet and wherein said spray means for spraying water into said gases is located so as to spray water into said gases prior to their passage through said muffler.

19. Apparatus according to claim 17 which comprises drain means for draining from said collection container free water collected in said container, water recycling means comprising a return line for directing water from said drain means through said return line to said spray means, and a pump for pumping water removed from said collection container by said drain means to said spray means.

20. Apparatus for purifying waste combustion gases which comprises elongated conduit means, a refrigerating unit for directing a refrigerant through said conduit means at a temperature sufficiently low to form ice on the surface thereof by the condensation and freezing thereon of moisture contained in gases in contact therewith, an ice contact chamber in the form of an elongated passage having an inlet and an outlet spaced from said inlet the inner surface of which is in proximate spaced relation with respect to the external surface of said elongated conduit means for extended travel of gases therethrough in contact with the external surface of said elongated conduit means, means for directing waste combustion gases into the inlet of said elongated passage for passage therethrough to said outlet, a succession of baffles within said passage which impart turbulence to said gases during their travel therethrough in contact with the external surface of said elongated conduit means, channel means comprises in said passage and disposed underneath said elongated conduit means for the reception of liquid and particulate accumulations released from the surface of said elongated conduit means, said channel means being adapted for the travel of said liquid and particulate accumulations received therein in the direction of travel of gases passing through said passage for discharge with said gases from the outlet of said passage, a collection container for said accumulations having an inlet and an outlet, conduit means connected betweeen said chamber and said container which is disposed to direct waste gases and said accumulations emerging from said outlet of said passage into said collection container through said inlet thereof, said collection container including separating means for the retention of said accumulations therein while permitting travel of waste gases therethrough from said inlet to said outlet of said collection container for discharge therefrom.

21. Apparatus according to claim 20 wherein said elongated conduit means and said passage comprised in said ice contact chamber are respectively in coil form having a plurality of reaches disposed approximately horizontally.

22. Apparatus according to claim 21 wherein said elongated conduit means is disposed substantially concentrically within said passage and wherein said baffles extend partially across said passage with the inner margin substantially vertically disposed and cut away to accommodate a portion of the external surface of said elongated conduit means, said baffles being disposed on opposite sides of said elongatee conduit means in staggered relation to provide support for said conduit means and leaving substantially unobstructed said channel means so as to permit travel of said liquid and particulate accumulations along said channel means to said outlet of the said passage comprises in said ice contact chamber.

23. Apparatus according to claim 20 wherein said collection container comprises an elongated passage for the travel of gases from said inlet to said outlet of said collection container, a receptacle for liquid and particulate accumulations disposed underneath said elongated passage, an elongated conduit means the external surface of which is in proximate spaced relation with respect to the inner surface of said passage in said collection container, and refrigerating means for directing a refrigerant through said elongated conduit means at a temperature sufficiently low to condense water vapor on said external surface thereof and convert it to ice.

24. Apparatus according to claim 23 wherein said elongated conduit means in said passage in said collection container is an extension of the elongated conduit means within the passage comprised in said ice contact chamber.

25. Apparatus according to claim 24, which also comprises a container for a liquified gaseous material having a sufficiently low temperature and valve controlled means for injecting said liquified gaseous material from said container into said ice contact chamber, whereby on starting there is a rapid chilling of the ice contact chamber so as to produce ice therein substantially immediately.

26. Apparatus according to claim 25 which comprises an engine starting switch and means for actuating said valve controlled means responsive to actuation of said engine starting switch.

* * * * *